(12) United States Patent
Dong

(10) Patent No.: US 8,404,373 B2
(45) Date of Patent: Mar. 26, 2013

(54) BATTERY COVER ASSEMBLY FOR PORTABLE ELECTRONIC DEVICE

(75) Inventor: Shui-Jin Dong, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 347 days.

(21) Appl. No.: 12/786,696

(22) Filed: May 25, 2010

(65) Prior Publication Data

US 2011/0159332 A1 Jun. 30, 2011

(30) Foreign Application Priority Data

Dec. 29, 2009 (CN) .......................... 2009 1 0312525

(51) Int. Cl.
*H01M 2/10* (2006.01)
*H01M 2/00* (2006.01)

(52) U.S. Cl. ......................................... 429/97; 429/163

(58) Field of Classification Search ....................... None
See application file for complete search history.

(56) References Cited

U.S. PATENT DOCUMENTS 4,218,522 A * 8/1980 Motoyoshi ..................... 429/97
2010/0020477 A1 * 1/2010 Chen ......................... 361/679.01

* cited by examiner

*Primary Examiner* — Patrick Ryan
*Assistant Examiner* — Yoshitoshi Takeuchi
(74) *Attorney, Agent, or Firm* — Altis Law Group, Inc.

(57) ABSTRACT

A battery cover assembly for a portable electronic device includes a base body, a battery cover, a rotatable member. The base body forms two hooks. The battery cover forms two catches for latching with the hooks. The rotatable member is rotatably disposed between the base body and the battery cover. The rotatable member includes two resisting portions for abutting against the catches. When the rotatable member is rotated, the catches are forced to be separate from the hooks to allow the battery cover to releasably latch to the base body.

9 Claims, 9 Drawing Sheets

BATTERY COVER ASSEMBLY FOR PORTABLE ELECTRONIC DEVICE

BACKGROUND

1. Technical Field

The present disclosure generally relates to battery cover assemblies and, particularly, to a battery cover assembly for use in a portable electronic device.

2. Description of Related Art

Batteries are widely used in portable electronic devices, such as personal digital assistants (PDAs), mobile phones, and so on. Conventional batteries are removably received in the electronic device, and battery covers are designed to connect to housings of the electronic devices to cover and protect the batteries. Batteries are replaced by opening the battery covers when, for example, the batteries are damaged and/or dead (i.e. no longer rechargeable).

Although battery cover assemblies may be simple, engagement between the battery cover and the housing of the mobile phone can be too firm to be easily undone.

Therefore, there is room for improvement within the art.

BRIEF DESCRIPTION OF THE DRAWINGS

Many aspects of the battery cover assembly can be better understood with reference to the following drawings. The components in the drawings are not necessarily drawn to scale, the emphasis instead being placed upon clearly illustrating the principles of the battery cover assembly. Moreover, in the drawings, like reference numerals designate corresponding parts throughout the several views, in which.

DETAILED DESCRIPTION

Figure 1:
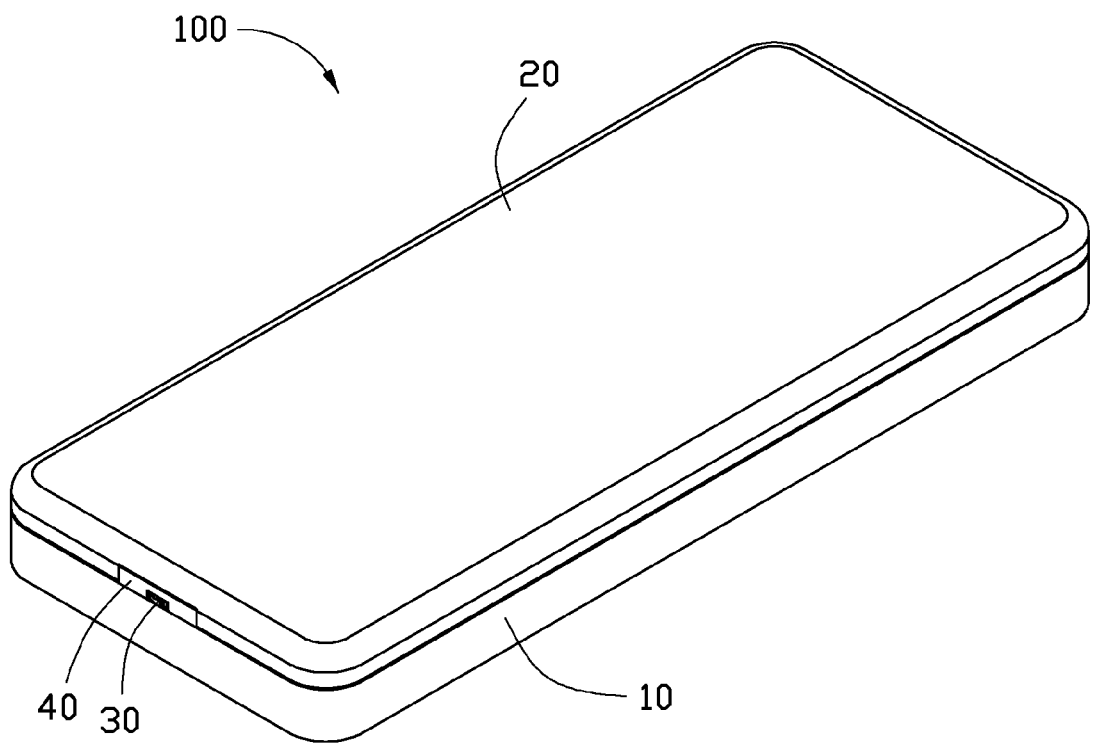
FIG. 1 is an assembly, isometric view of a portable electronic device employing a battery cover assembly in accordance with an exemplary embodiment.
Figure 2:
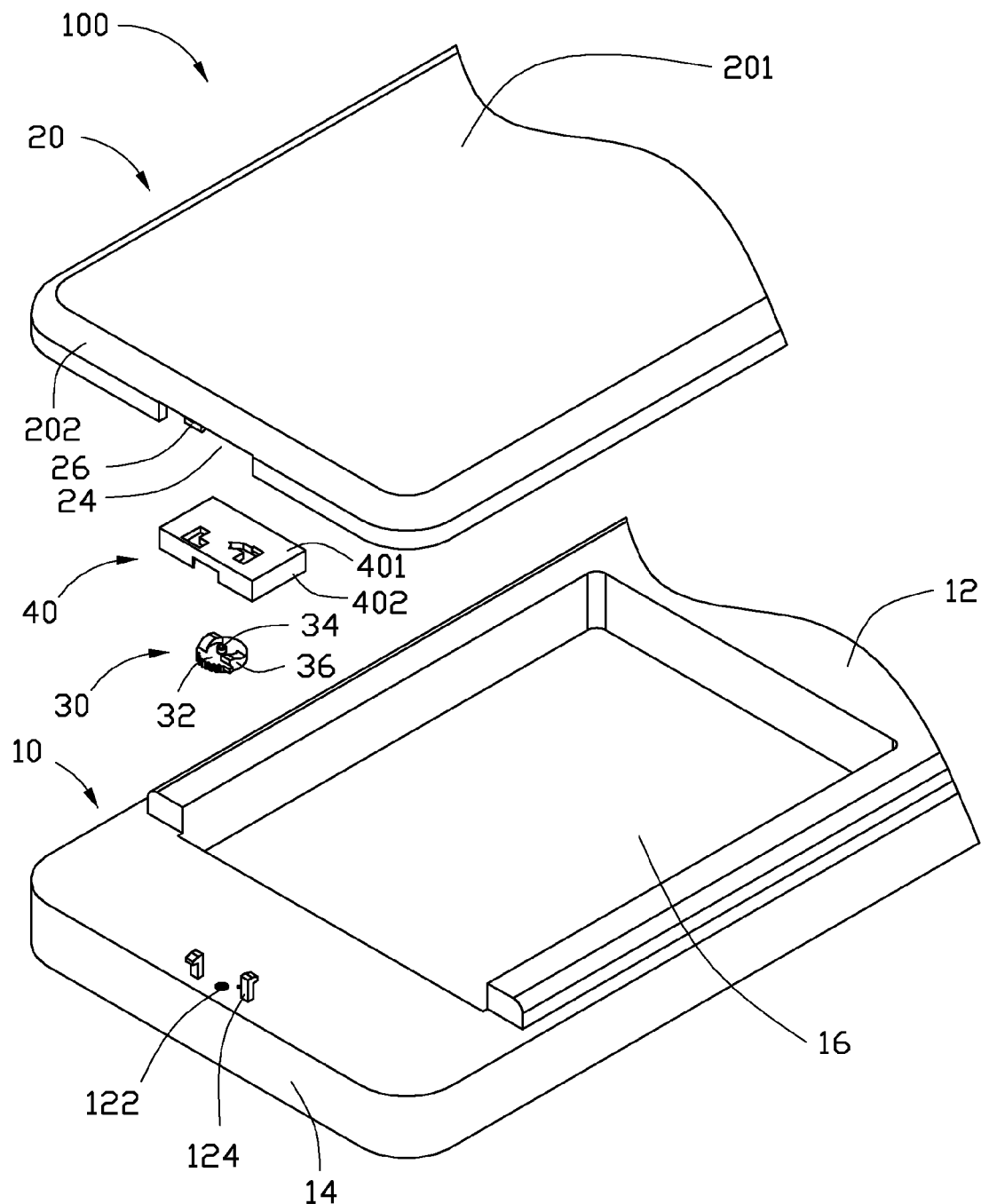
FIG. 2 is an exploded, isometric view of FIG. 1.

FIG. 1 shows a portable electronic device 100, such as a mobile phone, having a battery cover assembly. The mobile phone 100 is an exemplary application, for the purposes of describing details of an exemplary embodiment of a battery cover assembly. The battery cover assembly includes a base body 10, a battery cover 20, a rotatable member 30, and a seat 40. The rotatable member 30 and the seat 40 releasably latch the battery cover 20 to the base body 10.

The base body 10 includes an operating surface 12 and an end portion 14. The operating surface 12 defines a cavity 16 for receiving a battery (not shown). The end portion 14 defines a blind hole 122. Two elastic hooks 124 are formed on the end portion 14 on opposite sides of the blind hole 122. Distal ends of the hooks 124 face opposite directions.

Figure 3:
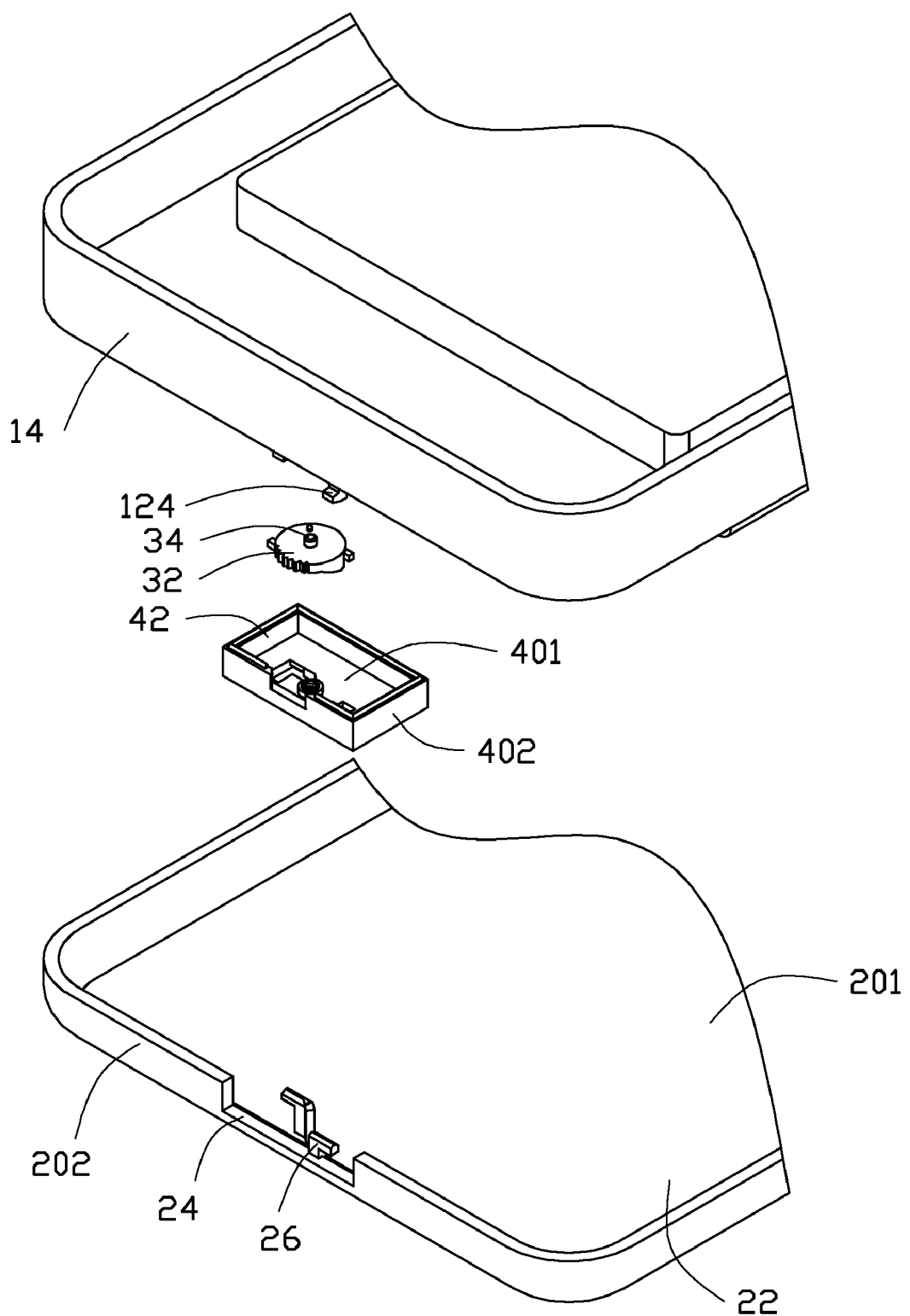
FIG. 3 is similar to FIG. 2, but shown from another aspect.

Referring to FIG. 3, the battery cover 20 has a shape corresponding to the base body 10 configured to be attached to the base body 10. The battery cover 20 includes a back plate 201 and sidewalls 202 extending from edges of the back plate 201. A space 22 is cooperatively defined by the back plate 201 and the sidewalls 202. One of the sidewalls 202 defines an opening 24 communicating with the space 22. Elastic catches 26 extend from the back plate 201 adjacent to the opening 24.

Figure 4:
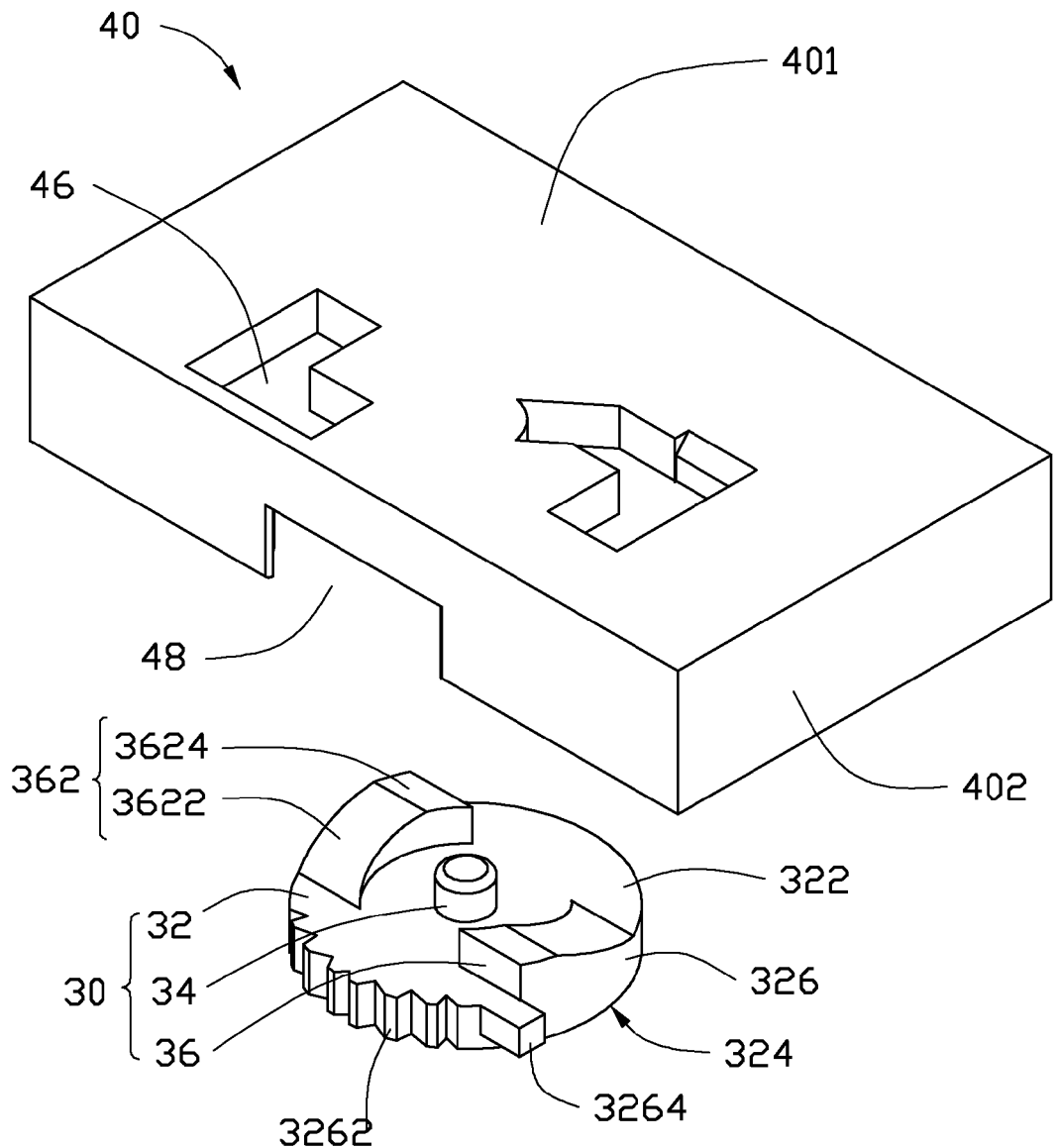
FIG. 4 is an enlarged view of the rotatable member and the seat shown in FIG. 1.
Figure 5:
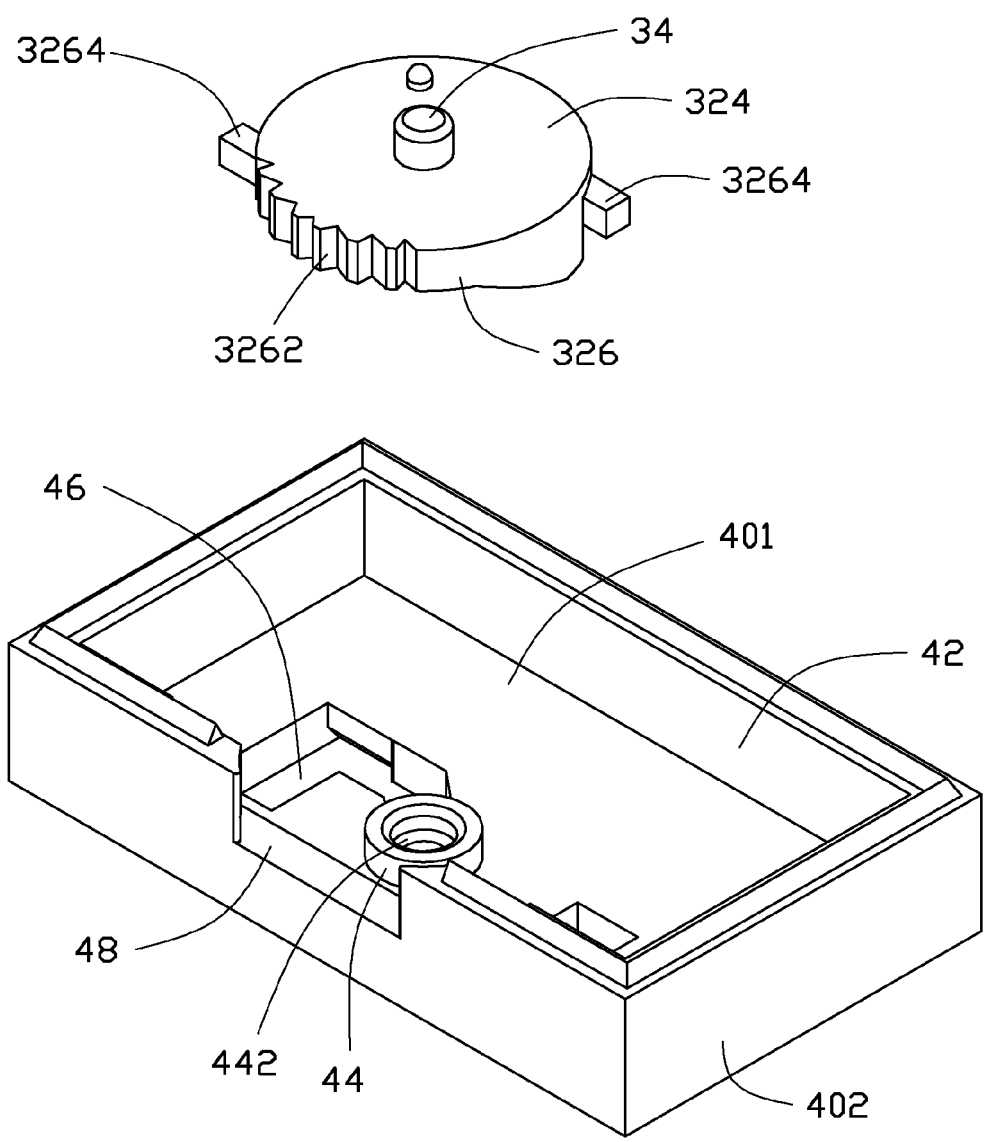
FIG. 5 is similar to FIG. 4, but shown from another aspect.

Referring to FIGS. 4 and 5, the rotatable member 30 is for unlocking or locking the battery cover 20 to the base body 10. The rotatable member 30 includes a disk body 32, a shaft 34 and two resisting portions 36. The disk body 32 includes a first surface 322, an opposite second surface 324, and a circumferential surface 326. The shaft 34 is fixed to a center of the disk body 32, and ends of the shaft 34 respectively extend from the first surface 322 and the second surface 324. An end of the shaft 34 spaced from the resisting portions 362 is engagable in the blind hole 122, and the rotatable member 30 may rotate around the shaft 34. Resisting portions 36 are symmetrically formed on an edge of the first surface 322. Each resisting portion 36 is substantially an arcuate block, and includes a resisting surface 362 for abutting against the catches 26. Each resisting surface 362 includes a sloping surface 3622 and a planar surface 3624. One end of the sloping surface 3622 is connected to the first surface 322, and the other end of the sloping surface 3622 is connected to the planar surface 3624. The planar surface 3624 is parallel to the first surface 322. A plurality of serrated ribs 3262 are formed on the circumferential surface 326. A limiting block 3264 perpendicularly projects from the circumferential surface 326 adjacent to each resisting portion 36.

The seat 40 is for covering the rotatable member 30. The seat 40 includes a base plate 401 and side plates 402. A receiving compartment 42 is cooperatively defined by the base plate 401 and the side plates 402. A sleeve 44 is formed on the base plate 401 in the receiving compartment 42. The sleeve 44 defines a through hole 442 for receiving the other end of the shaft 34 adjacent to the resisting portions 362. The base plate 401 defines two assembly holes 46. Each assembly hole 46 is positioned at one side of the sleeve 44. The position of the assembly holes 46 corresponds to the hooks 126. The catches 26 are latched with the hooks in the assembly holes 46. One of the side plates 402 defines a notch 48 communicating with the receiving compartment 42.

Figure 6:
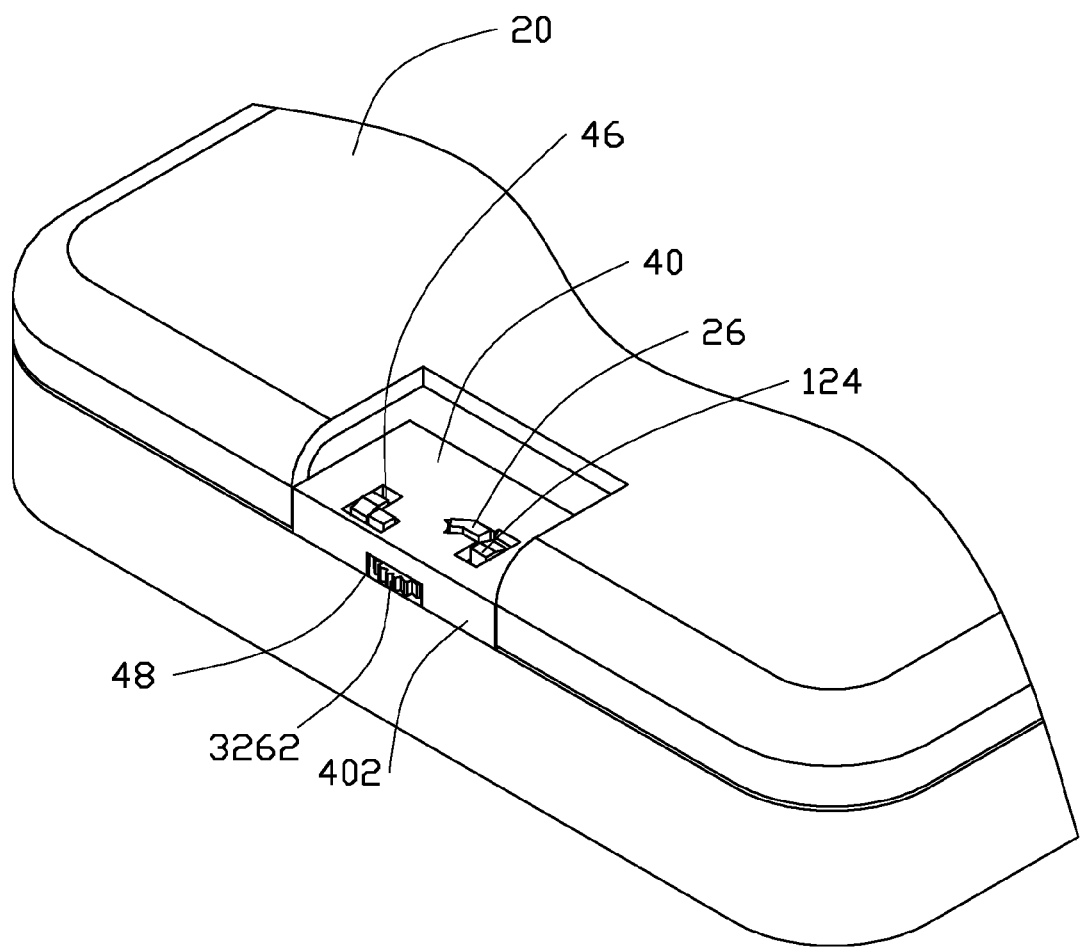
FIG. 6 is a partially assembly view showing a locked state.
Figure 7:
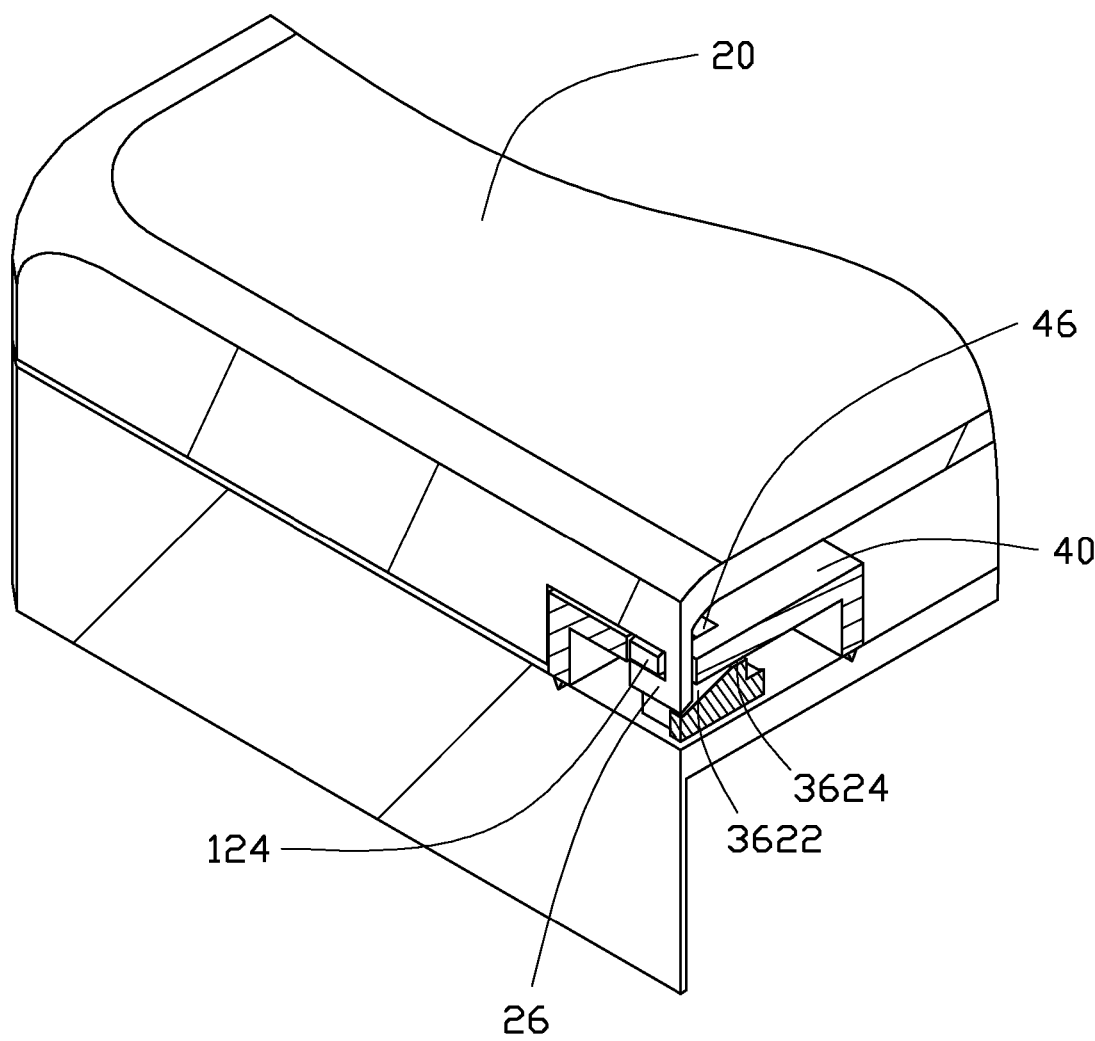
FIG. 7 is a cross-sectional view of the battery cover assembly of FIG. 6.

During assembly of the battery cover assembly, referring to FIGS. 6 and 7, first, the rotatable member 30 is disposed on the base body 10 between the hooks 124. The second surface 324 faces the base body 10, and an end of the shaft 34 at the side of the second surface 324 is rotatably received in the blind hole 122. Then, the assembly holes 46 are aligned with the hooks 124, and the notch 48 is aligned with the ribs 3262. The other end of the shaft 34 is received in the through hole 442. The seat 40 covers the rotatable member 30, and is fixed on the base body 10 by use of, for example, hot melting. Thus, the rotatable member 30 is rotatably positioned between the seat 40 and the base body 10. The ribs 3262 are exposed by the notch 48. The battery cover 20 is pressed downward, and forces the catches 26 to extend into the assembly holes 46. The catches 26 are latched with the hooks 124, and distal ends of the catches 26 resist a lower part of the sloping surface 3622 of the resisting portions 36. Thus, the battery cover 20 is assembly in the base body 11. The ribs 3262 are exposed from the opening 24 of the battery cover 20.

Figure 8:
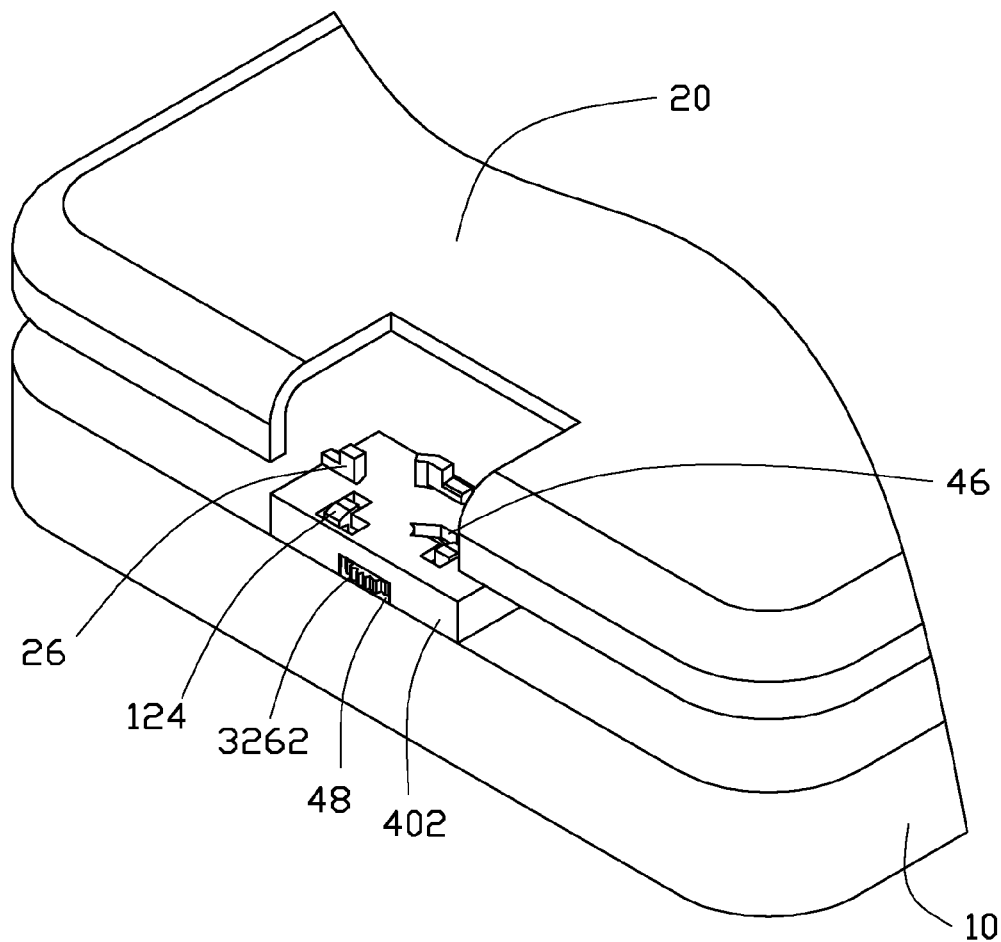
FIG. 8 is a partially assembly view showing a unlocked state.
Figure 9:
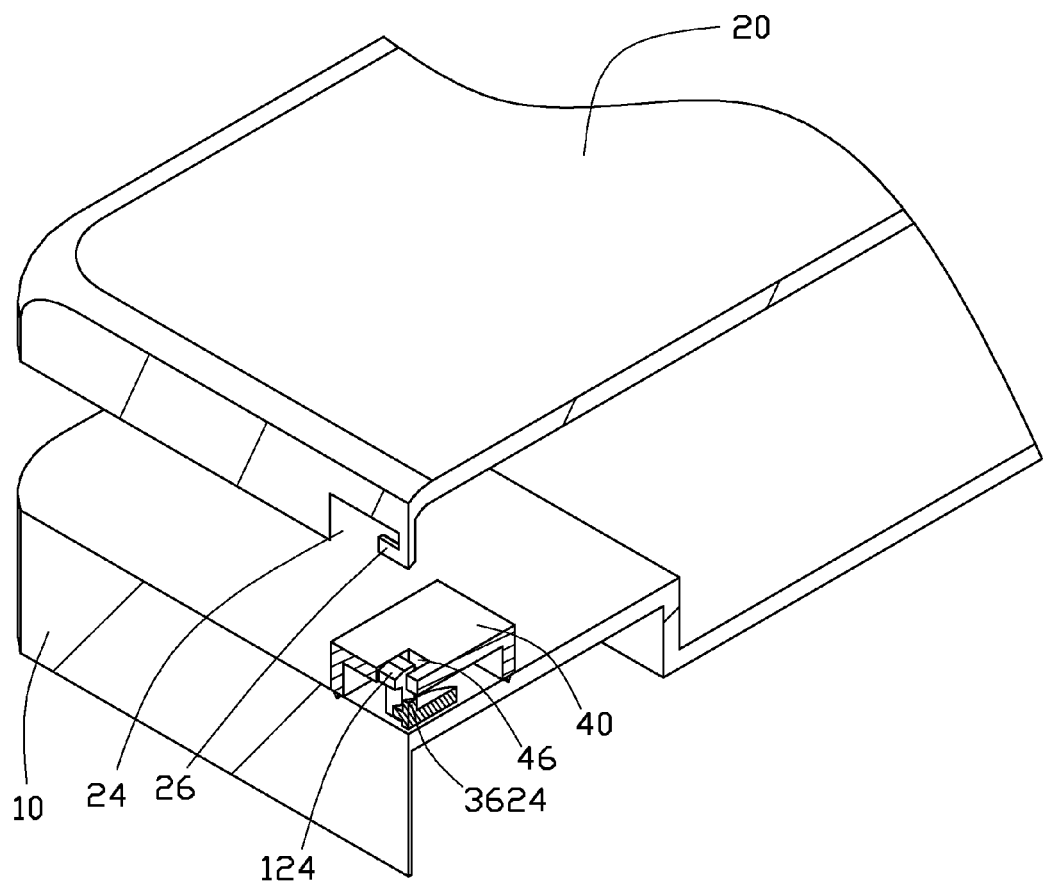
FIG. 9 is a cross-sectional view of the battery cover assembly of FIG. 8.

Referring to FIGS. 8 and 9, when the battery cover 20 is to be opened, the ribs 3262 are rotated to force the sloping surface 3622 and the planar surface 3624 to move. Their movement gradually elevates and deforms the catches. When the limiting blocks 3264 respectively resist the base body 10 at two sides of the notch 48, the catches 26 move the planar surface 3624 to allow the hooks 124 to separate from the catches 26. The battery cover 20 can then be removed.

As described above, the exemplary embodiment provides a battery cover assembly for portable electronic devices, such as mobile phones. The battery cover of the battery cover assembly can be easily opened and more user-friendly.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A battery cover assembly for a portable electronic device, the battery cover assembly comprising:
    a base body forming two hooks;
    a battery cover forming two catches for latching with the hooks;
    a rotatable member including two resisting portions;
    a separate seat positioned on the base body, the rotatable member rotatably positioned between the base body and the separate seat, the separate seat defining two assembly holes, the catches extending into the assembly holes and latched with the hooks, the resisting portions of the rotatable member abutting against the catches; and
    wherein when the rotatable member is rotated, the resisting portions force the catches to separate from the hooks to allow the battery cover to releasably latch to the base body.

2. The battery cover assembly as claimed in claim 1, wherein the rotatable member includes a disk body and a shaft, the resisting portions are symmetrically formed on an edge of the disk body, the shaft is fixed to a center of the disk body, and ends of the shaft respectively extend from sides of the disk body.

3. The battery cover assembly as claimed in claim 2, wherein the base body defines a blind hole, the hooks are formed on opposite sides of the blind hole, distal ends of the hooks fact opposite directions, an end of the shaft is rotatably received in the blind hole.

4. The battery cover assembly as claimed in claim 1, wherein each resisting portion is substantially an arcuate block, and includes a resisting surface, each resisting surface includes a sloped surface and a planar surface, the planar surface parallel to the base body, and the catches movably contacts from a lower end of the sloped surface to a higher end of the sloped surface to elevates and deform the catches.

5. The battery cover assembly as claimed in claim 2, wherein a plurality of ribs are formed on a circumferential surface of the base body, and the ribs are exposed from the battery cover.

6. The battery cover assembly as claimed in claim 2, wherein a limiting block perpendicularly projects from a circumferential surface of the base body adjacent to each resisting portion.

7. The battery cover assembly as claimed in claim 1, wherein the seat includes a base plate and side plates, a receiving compartment is cooperatively defined by the base plate and the side plates.

8. The battery cover assembly as claimed in claim 7, wherein a sleeve is formed on the base plate in the receiving compartment, the sleeve defines a through hole the rotatable member includes a disk body and a shaft, the resisting portions are symmetrically formed on an edge of the disk body, the shaft is fixed to a center of the disk body, and a first end and a second end of the shaft respectively extend from sides of the disk body, the first end is rotatably received in the through hole, and the second end is rotatably received in the base body.

9. The battery cover assembly as claimed in claim 7, wherein one of the side plates defines a notch communicating with the receiving compartment.

* * * * *